Feb. 21, 1939. H. H. KERR 2,148,268
BRAKE
Filed Oct. 16, 1935 6 Sheets-Sheet 1

INVENTOR.
HENRY H. KERR
BY Jerome R. Cox
ATTORNEY.

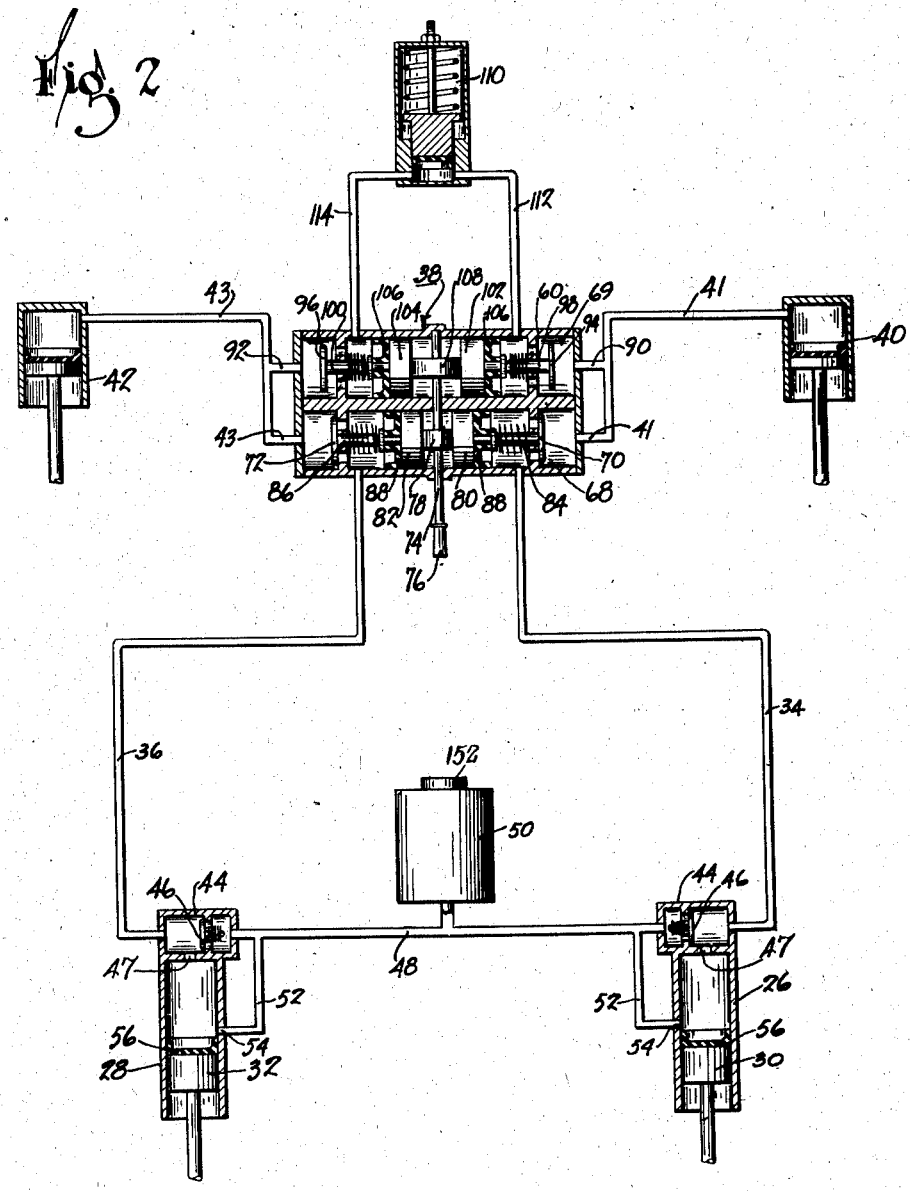

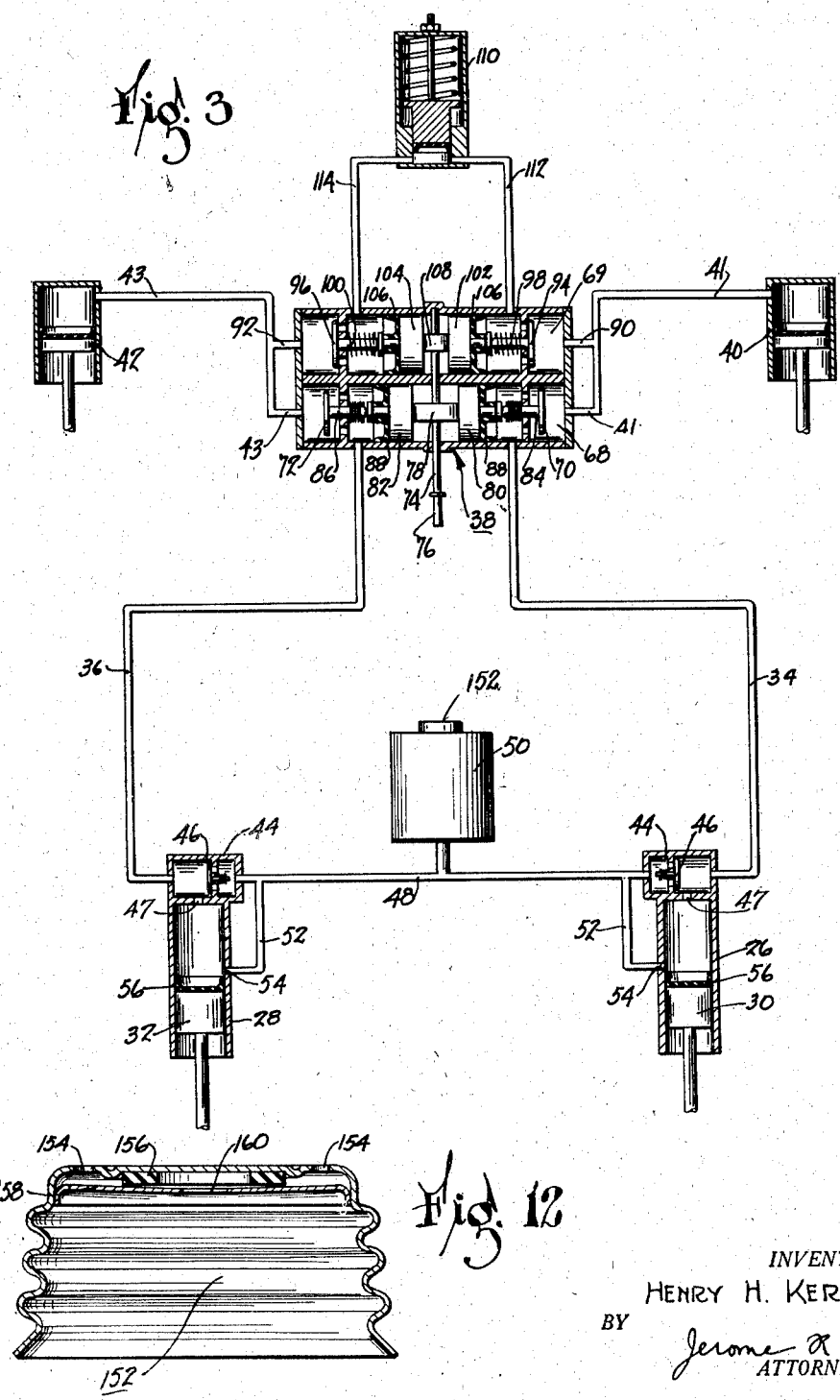

Feb. 21, 1939. H. H. KERR 2,148,268
BRAKE
Filed Oct. 16, 1935 6 Sheets-Sheet 4
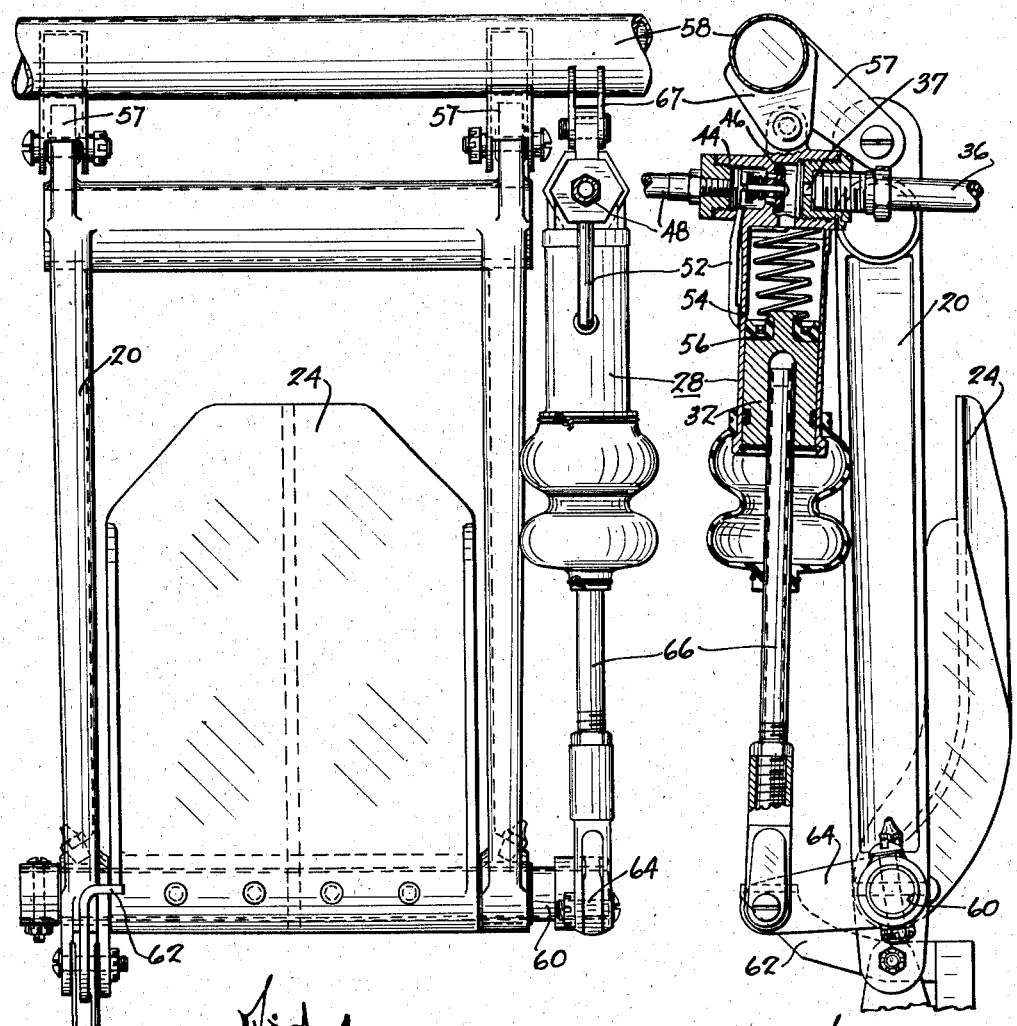
INVENTOR.
HENRY H. KERR
BY Jerome R. Cox
ATTORNEY.

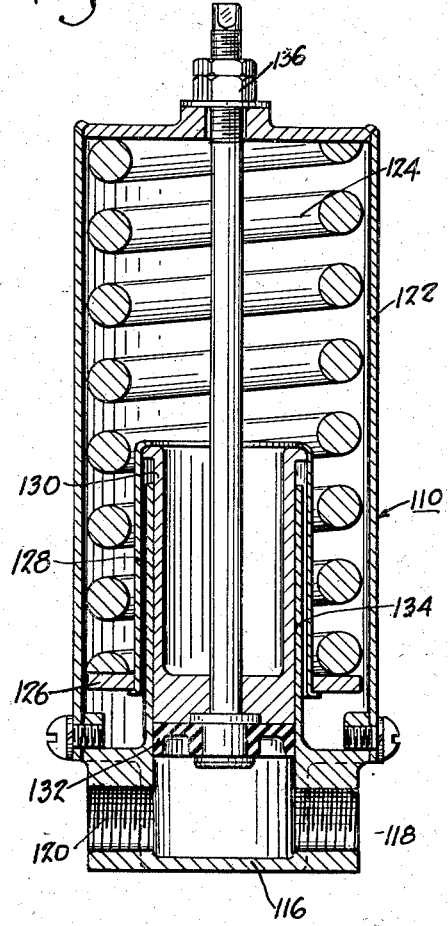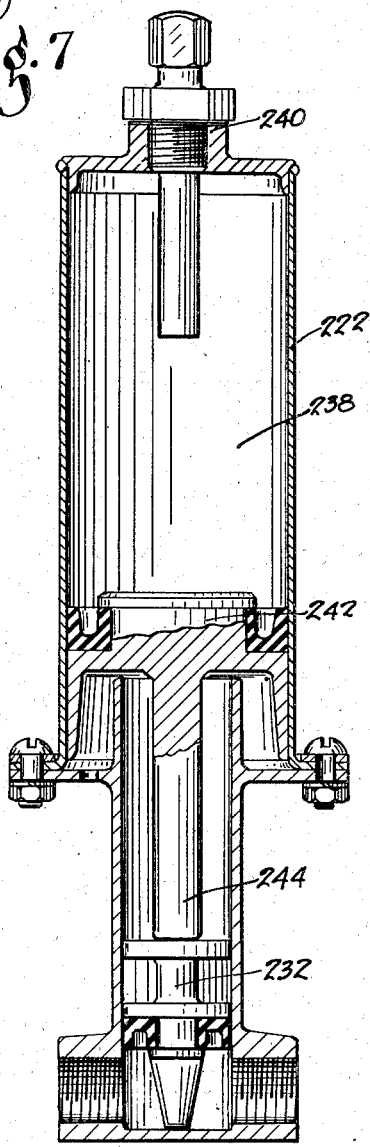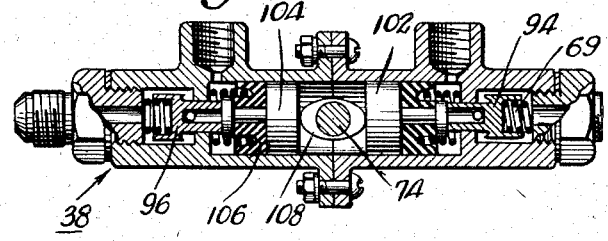

Feb. 21, 1939.   H. H. KERR   2,148,268
BRAKE
Filed Oct. 16, 1935   6 Sheets-Sheet 6
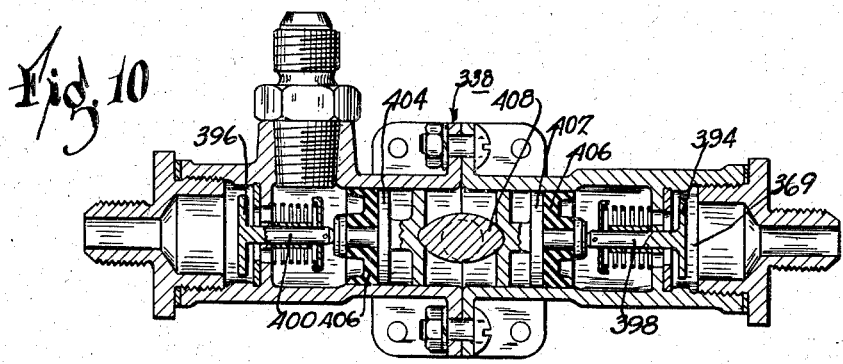
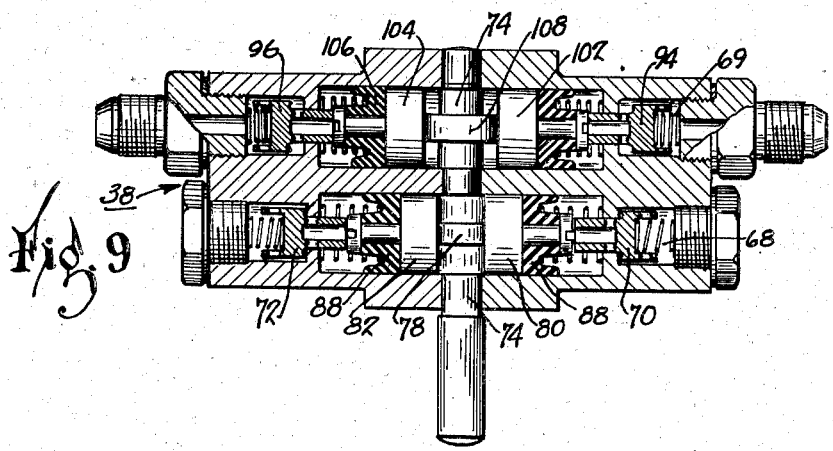
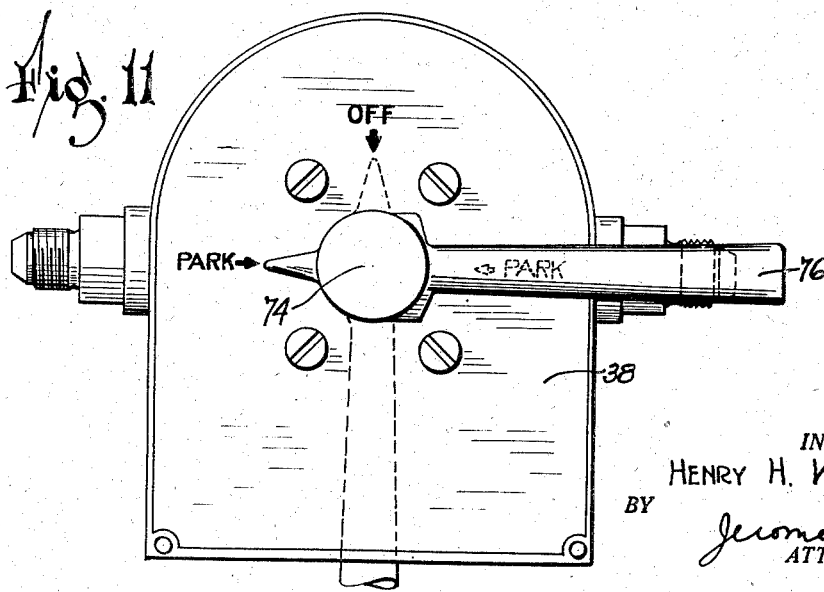
INVENTOR.
HENRY H. KERR
BY
Jerome R. Cox
ATTORNEY Patented Feb. 21, 1939

2,148,268

UNITED STATES PATENT OFFICE 2,148,268

BRAKE

Henry H. Kerr, South Bend, Ind., assignor to Bendix Products Corporation, South Bend, Ind., a corporation of Indiana Application October 16, 1935, Serial No. 45,251

12 Claims. (Cl. 188—152)

This invention relates to hydraulic actuating systems or the like and more particularly to hydraulic brakes and has been illustrated as applied to an airplane braking system having means for locking the brakes when it is desired to park the airplane.

An object of the invention is to provide a hydraulic actuating device having means for maintaining it in actuated position for indeterminate periods under substantially constant pressure irrespective of temperature changes.

One of the objects of this invention is to provide an efficient parking brake for an airplane.

Another object of the invention is to provide in combination with a parking brake system for an airplane, means to compensate for variations in the volume of fluid by reason of temperature changes.

Another object of the invention is to provide independent hydraulic brakes for two or more wheels of an airplane so arranged as to maintain on said brakes a uniform braking fluid pressure over long periods of time.

One of the features of the arrangement shown is the provision of a loaded reservoir adapted to maintain pressure on the fluid so as to maintain the brakes applied when the airplane is parked.

A further feature of the arrangement is the provision of alternative forms of loading comprising a spring loading means and means for maintaining an air pressure loading on the brakes during parking.

A further feature of the arrangement is the provision of a double valve arranged to connect the brake cylinders alternatively with independent controls therefor operated by the brake pedals or with the loaded reservoir and each other.

Further features and objects of the invention will be apparent after a reading of the subjoined specification and claims and after a consideration of the accompanying drawings, in which:

Figure 2 is a sectional view showing more or less diagrammatically the master cylinders, wheel cylinders, valves, and pressure cylinder comprising my braking system in the position of the parts when the parking brake is applied;

Figure 3 is a view similar to Figure 2 showing the position of the parts when the apparatus is arranged to be operated by the foot pedals;

Figure 4 is a detailed view in elevation of one of the foot pedals including one of the master cylinders mounted thereon;

Figure 5 is a sectional view taken substantially on the line 5—5 of Figure 4;

Figure 6 is a sectional view of the spring loaded pressure reservoir or pressure cylinder shown in Figures 1, 2 and 3;

Figure 7 is a view of an alternate form of pressure cylinder or reservoir;

Figure 8 is a view in section of the valve shown more or less diagrammatically in Figures 2 and 3 being shown in Figure 8 on an enlarged scale;

Figure 9 is a view in section taken at right angles to the view of Figure 8, Figure 9 being also on an enlarged scale relative to Figures 2 and 3;

Figure 10 is a view similar to Figure 8, showing a modified form of valve;

Figure 11 is a view in elevation of the valve shown in Figures 8 and 9 and showing the handle and arrangements for controlling the valve; and Figure 12 is an enlarged view of a detail of the reservoir.

Figure 1:
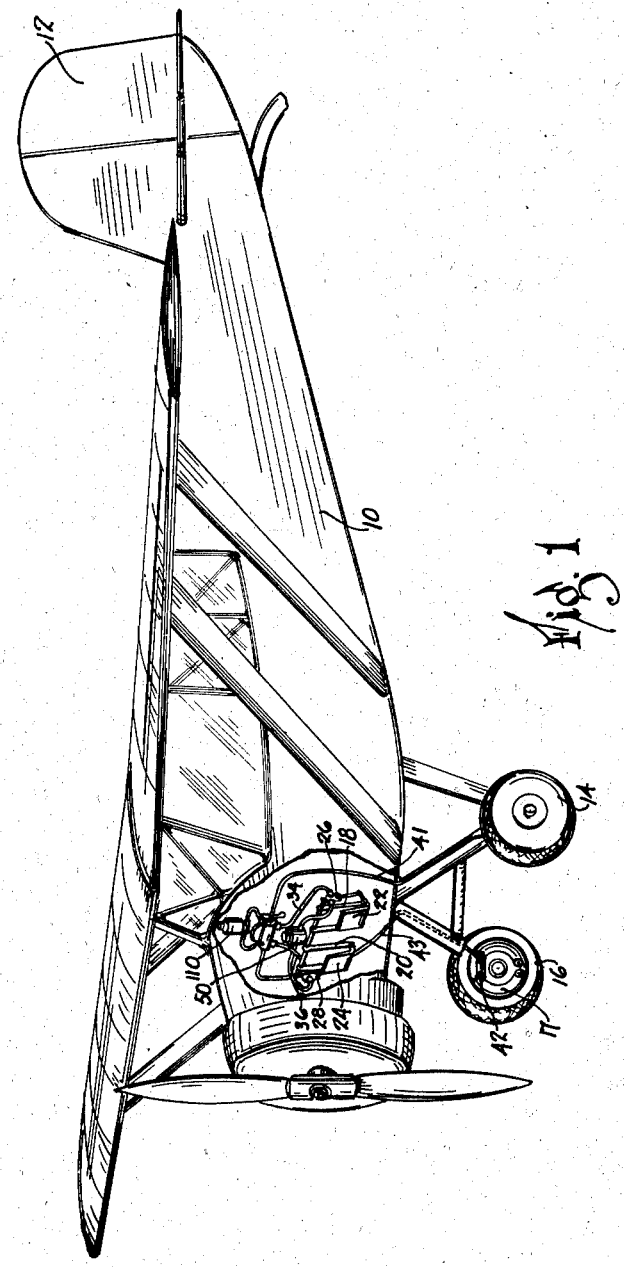
Figure 1 is a more or less diagrammatic view of an airplane including hydraulically operated wheel brakes and hydraulic lines leading thereto, a rudder and rudder control apparatus including foot pedals having parts arranged to control the wheel brakes.

Referring in detail to the drawings, it may be seen that I have shown in Figure 1 an airplane 10 equipped with a rudder 12 and landing wheels 14 and 16. Rudder pedals 18 and 20 are arranged to control the rudder 12 and are provided with pivoted pedals 22 and 24 respectively which are arranged to operate master cylinders 26 and 28 to control the brakes 17 of the landing wheels 14 and 16. In general, the braking system is shown more clearly in Figures 2 and 3. Therein it may be seen that master cylinders 26 and 28 having pistons 30 and 32 are connected through conduits 34 and 36 and through valve member 38 with wheel cylinders 40 and 42. By reference to Figure 1, it may be seen that wheel cylinder 42 is arranged to operate the brake 17 of the wheel 16. Similarly, wheel cylinder 40 is arranged to operate the brake 17 of the wheel 14. I have shown pistons 30 and 32 operated directly by the pedals 22 and 24.

The master cylinders have provided in their outer ends valve casings such as 44 each having a check valve 46 near its center and each having one end connected with the conduits 34 and 36 and by a port 47, with its associated cylinder 26 or 28 and the other end connected through a conduit 48 with a supply reservoir 50. The conduit 48 is connected by branch conduits 52 with inlet ports 54 in the cylinders 26 and 28, said ports being positioned just in advance of the normal rearward position of the cups 56 associated with the pistons 30 and 32.

In Figures 4 and 5 one practical arrangement of the master cylinder is shown instead of the diagrammatic showing in Figures 1, 2 and 3. Therein it may be seen that the stirrup of rudder pedal 20 pivoted on supports 57 welded on the shaft 58 carries at its lower extremity a shaft 60 on which there is pivoted the pedal 24. The pedal 24 is normally held in neutral position by a stop 62. Rotation of the pedal 24 about the axis of the shaft 60 causes rotation of the arm 64 and thus causes the piston rod 66 to move upward relative to the master cylinder 28 which is pivoted on a support 67 welded to the shaft 58. This causes the master cylinder piston 32 and its associated rubber cup 56 to pass over the inlet port 54 cutting off the connection through conduit 52 with conduit 48 and thus with the reservoir and compressing fluid to exert pressure on the fluid in the conduit 36 leading to the brakes. The check valve 46 in the casing 44 prevents the fluid under pressure from passing out through the conduit 48 to the reservoir. On the return stroke, however, fluid may be drawn in from the reservoir past the check valve 46 into the master cylinder 28 in order to prevent the drawing of air into said cylinder, it being understood that the spring on the check valve 46 is very light.

Referring to the valve 38 and more especially to Figures 1, 2, 3, 8, 9 and 11, it may be seen that the valve comprises two parallel cylinders, with one of which the conduits 34 and 36 connect, this cylinder being numbered 68 and the other parallel cylinder being numbered 69. The cylinder 68 is provided with a pair of check valves 70 and 72 which in one position as shown in Figure 2 allow fluid to pass from the master cylinders 26 and 28 to the wheel cylinders 40 and 42, but do not allow the fluid to return from the wheel cylinders. This is the arrangement of the valve when the brake is locked so that the airplane may be held in a parked position. In the position of the check valves shown in Figure 3, inasmuch as the valves 70 and 72 are held from their seats, fluid may pass freely from the wheel cylinders 40 and 42 to the master cylinders 26 and 28, as well as freely in the opposite direction.

The means for holding the check valves from their seats comprises a shaft 74 provided with a handle 76 (see Figure 11) for rotating the shaft. The shaft carries a cam 78 interposed between a pair of pistons 80 and 82, the pistons being arranged to contact with stems 84 and 86 of check valves 70 and 72 and being provided with cups 88 for sealing.

The cylinder 69 is also connected with conduits 41 and 43 leading to the wheel cylinders 40 and 42 by means of branch connections 90 and 92. It is provided with a similar system of check valves including valves 94 and 96, valve stems 98 and 100, pistons 102 and 104, sealing cups 106, and a cam 108 also secured to the shaft 74. Thus in the position shown in Figure 3 fluid may pass from a pressure reservoir 110 through conduits 112 and 114 to the wheel cylinders 40 and 42 but may not pass in the reverse direction. In this position of the cams 108 and 78, the pressure reservoir is for all intents and purposes isolated from the brake system and the system acts as a conventional hydraulic braking system. However, in the position shown in Figure 2, fluid forced by the master cylinders 26 and 28 through the check valves 70 and 72 is trapped in the wheel cylinders 40 and 42 and so pressure builds up in the conduits 41 and 43, the cylinder 69, the conduits 112 and 114 and in the pressure reservoir 110. Inasmuch as this built up pressure cannot be relieved back to the supply reservoir 50 because the check valves 70 and 72 are closed, this pressure which is thus built up in the reservoir 110 by operation of the master cylinder will be maintained on the brakes to hold the brakes in their applied position for parking. Were the reservoir 110 omitted, changes in temperature during the relatively long periods when the airplane is parked would possibly cause the brakes either to be relieved or to be locked on so tightly that damage might be done, or at least so tightly that it would be impossible to relieve the brakes when desired.

The practical arrangement of the valve 38 including the cylinders 68 and 69 and the check valves 70, 72, 94 and 96 is shown in Figures 8 and 9 wherein the same reference numerals are applied to similar parts.

The valve shown in Figure 10 is substantially the same as that shown in Figures 8 and 9, and corresponding parts are designated by similar numerals with the addition of 300. Thus, the valve as a whole is designated 338, the cam is designated 408, the valve pistons 402 and 404, the cups therefor 406, the valve stems 398 and 400, the valve closures 394 and 396, and the valve cylinder 369.

The pressure reservoir 110 is shown more clearly in Figure 6 wherein there is shown a casting 116 having tapped bores 118 and 120 arranged to be connected to conduits 112 and 114 and having secured thereto a cylinder 122 in which there is arranged a spring 124 bearing upon the head of the cylinder at one end and at its other end upon an annular plate 126 engaged with a cage 128. The cage bears on the upper end of a piston 130 provided with a sealing cup 132. Thus liquid trapped under the piston 130 forces the piston upward in the bore 134 compressing the spring 124 and maintaining a substantially uniform pressure of the strength of the spring upon the liquid in the pressure reservoir and in the wheel cylinders. The strength of the spring may be varied by adjustment of the nuts 136. That is to say the spring 124 is preloaded by adjustment of the nut 136. In pumping up the pressure for parking this predetermined pressure is quickly reached inasmuch as the fluid used is substantially incompressible and the spring does not begin to compress until the predetermined pressure is reached. Thus very little extra liquid is required to build up the necessary pressure.

In Figure 7 an alternative arrangement is shown in which the cylinder 222 is provided with an air chamber 238 in which there is maintained air under a predetermined pressure which may be supplied by an air pump through the plug 240. Within the cylinder 222 is an air piston 242 which may move upward to compress the air in the chamber 238. The piston 242 is provided with a projection 244 bearing upon a liquid piston 232 which acts in a manner similar to the piston 132 shown in Figure 6. The stop on the lower end of the piston 232 limits the lower movement of the piston and thus maintains the preloaded pressure substantially uniform.

The reservoir 50 is provided with a vented cover 152 provided with ports 154 and with an annular sealing ring 156. A spring snap disk 158 formed with a central opening 160 is arranged to seal the cover when the airplane is inverted, thus preventing loss of liquid. However, when pressure in the reservoir becomes appreciably less than atmospheric (as when considerable liquid is withdrawn therefrom in pumping the brakes to their parked condition), the disk 158 snaps back to the position shown, thus venting the reservoir.

It is believed that the operation of the above device will be apparent from the above description. When the valves are set in the position shown in Figure 3 and the airplane is in operation, movement of the pedals 22 and 24 operates the master cylinders 26 and 28 to force fluid through the valve 38 to the wheel cylinders 40 and 42 respectively to apply the brakes and similarly release of the pedals allows the fluid to return to release the brakes. When the airplane is to be parked the handle 76 of the valve 38 is turned to the position shown in Figure 10 and thus the check valves 70 and 72 are allowed to return to the position shown in Figure 2. Then operation of either one or both of the master cylinders forces fluid past these check valves into both of the wheel cylinders and into the pressure cylinder 110 building up the predetermined pressure for which the spring 124 is set. The pressure built up for holding the brakes applied for parking is equally distributed to both sets of brakes regardless of whether one or both master cylinders is used as a pump. Thus both brakes are applied equally. This predetermined pressure is maintained on the wheel cylinders while the airplane is parked. Increases or decreases of volume of the fluid due to changes in temperature or any other conditions are compensated for by movement of the piston 134 under the control of the spring 124. Thus the airplane is maintained locked. In order to release the parking brake the lever 76 is moved to the dotted line position of the Figure 10, whereupon the excess pressure forces the fluid back from the pressure cylinder 110 and from the wheel cylinders 40 and 42 to the master cylinders 26 and 28 and to the supply reservoir 50.

Thus it may be seen that I have provided a parking brake for airplanes utilizing the same braking system for parking as is used for the service brakes and having provided means for compensating for the effect of temperature changes on the volume of fluid in the hydraulic brake system. I have provided independent braking for the two wheels of the airplane when it is in motion. I have provided means for maintaining a fairly uniform fluid pressure in the brake cylinders over a long period of time for the purpose of parking the airplane. I have shown two arrangements for operating a flexible loading for the fluid in the hydraulic brake system and have shown arrangements in both to preload the device to a certain predetermined pressure.

Furthermore, it may be seen that my arrangement is valuable also when bleeding air from the lines either when initially filling the lines with fluid or later when necessary. This is accomplished as follows: The valves are set in their position shown in Figure 3. The bleeder valves at the wheel cylinders are opened. The master cylinders are operated, thus pumping air and fluid out of the bleeder valves until all of the air is pumped out. The valve 38 is then changed to the parking position. One of the bleeder valves is closed leaving the other open. The opposite master cylinder is pumped. In this way fluid is forced through one of the check valves 70 or 72, thence through the associated check valve 94 or 96, thence through the cylinder 110 and through the other check valve 94 or 96 and out of the wheel cylinder.

It is to be noted that when the lever 76 is moved to the dotted line position and the brake pedals are released, the liquid trapped in the cylinder 110 and the brake cylinders 40 and 42 can flow back freely to the reservoir 50. From the cylinders 26 and 28 the liquid can obviously pass through the ports 54 and the conduits 52 to the reservoir 50. It is to be further understood that in operating the lever 76 to move the valves 70, 72, 94 and 96, the pressure on the valves is balanced so that there is substantially no resistance to operation of the valves even though the pressure in the liquid trapped by said valves may be considerable.

It is to be understood that the above-described embodiments of the invention are for the purpose of illustration only and various changes may be made therein without departing from the spirit and scope of the invention.

I claim:

1. In a hydraulic braking system for airplanes, a pair of landing wheels, a pair of wheel brakes therefor, wheel cylinders for said wheel brakes, a pair of master cylinders each connected separately with one of said wheel cylinders, means for operating said master cylinders to supply fluid pressure to the wheel cylinders independently or concurrently and to relieve said pressure, and means for developing and maintaining a substantially predetermined pressure in said wheel cylinders regardless of subsequent condition of said master cylinder and of temperature conditions.

2. The structure claimed in claim 1 further characterized by the fact that the structure is to be associated with an airplane having a rudder and having foot pedals on which the master cylinders are mounted, and which are arranged to operate the rudder of the airplane and that the means for developing and maintaining the predetermined pressure includes a valve and a pressure reservoir mounted upon a relatively stationary part of said airplane.

3. The structure claimed in claim 1 characterized further in that the means for developing and maintaining the predetermined pressure includes a pressure reservoir comprising a casting to which there is secured a cylindrical container, a spring in said container, a cage upon which the spring exerts pressure, and a piston contacting with said spring and exerting pressure on the fluid of said casting.

4. The structure of claim 1 further characterized in that the means for developing and maintaining pressure includes a casting having a cylindrical member secured thereto and formed with a cylindrical container, a liquid piston movable in said container, an air piston movable in said air container and formed with a projection which contacts with said liquid piston.

5. The structure of claim 1 further characterized in that said means for developing and maintaining pressure includes a valve formed by a pair of parallel cylinders, each provided with a pair of check valves.

6. The structure as claimed in claim 1 further characterized by the fact that the means for developing and maintaining pressure includes a valve comprising two pairs of parallel cylinders each provided with a pair of check valves, and a cam shaft extending through said valve provided with a pair of cams each of which is arranged to operate the check valves in one of said parallel cylinders.

7. The structure as claimed in claim 1 further characterized by the fact that the means for developing and maintaining pressure includes a valve comprising two pairs of parallel cylinders each provided with a pair of sealing pistons and a pair of check valves, and a cam shaft extending through said valve provided with a pair of cams each of which is arranged to operate the check valves in one of said parallel cylinders and further characterized by the fact that said cams contact with the pair of sealing pistons in the cylinder and the sealing pistons at times contact with stems on said check valves for moving the check valves from their seats.

8. The structure defined by claim 1 further characterized in that the last named means maintains a substantially equal pressure on both of said wheel cylinders.

9. In a hydraulic actuating system, a pressure actuated means, a pressure creating means, means for operating said pressure creating means to develop fluid pressure in the pressure actuated means and normally to relieve said pressure, and means for optionally maintaining a substantially predetermined pressure so developed in said actuated means regardless of subsequent actuation of the pressure creating means to relieve said pressure and of temperature conditions.

10. In a hydraulic actuating system, pressure creating means, pressure actuated means, pressure storing means, and control means connected to all of said means so constructed and arranged that in one position thereof the pressure creating means communicates directly with the pressure actuated means for normal operation, and in another position the pressure creating means communicates with the pressure storing means to store pressure therein and the storing means communicates with the pressure actuated means to hold it in actuated position for an indeterminate period.

11. A hydraulic actuating system comprising means for creating fluid pressure, fluid pressure actuated means, means for storing fluid pressure, a connection between said pressure creating and said pressure actuated means, a connection between said fluid pressure actuated means and said fluid pressure storing means, check valves in each of said connections and means for rendering the check valves in said first connection inoperable while allowing the check valves in the second connection to operate and for rendering the check valves in said second connection inoperable while allowing the valves in the first connection to operate.

12. In a hydraulic brake system, a master cylinder, a wheel cylinder, a brake operated thereby, a pressure reservoir, control means, connections from the master cylinder, the wheel cylinder and the reservoir to said control means, said control means being so constructed and arranged that in one position the reservoir is isolated from the system and the system is operable in the normal manner to apply and release the brake, and in another position the master cylinder acts as a pump to store fluid under pressure in the reservoir and the fluid under pressure in the reservoir acts on the wheel cylinder to hold the brake applied for an indeterminate period.

HENRY H. KERR.